US012596282B2

(12) United States Patent
Yande

(10) Patent No.: US 12,596,282 B2
(45) Date of Patent: Apr. 7, 2026

(54) ADAPTIVE WINDOW-TINTING SYSTEM AND METHOD OF USE

(71) Applicant: Deere & Company, Moline, IL (US)

(72) Inventor: Sarang Milind Yande, Pune (IN)

(73) Assignee: Deere & Company, Moline, IL (US)

( * ) Notice: Subject to any disclaimer, the term of this patent is extended or adjusted under 35 U.S.C. 154(b) by 408 days.

(21) Appl. No.: 18/317,289

(22) Filed: May 15, 2023

(65) Prior Publication Data

US 2024/0385487 A1 Nov. 21, 2024

(51) Int. Cl.
G02F 1/163 (2006.01)
B60J 3/04 (2006.01)
B60R 16/03 (2006.01)

(52) U.S. Cl.
CPC ................ G02F 1/163 (2013.01); B60J 3/04 (2013.01); B60R 16/03 (2013.01)

(58) Field of Classification Search
CPC . G02F 1/163; B60J 3/04; B60R 16/03; B60K 2360/1464; B60K 35/10
See application file for complete search history.

(56) References Cited

U.S. PATENT DOCUMENTS 10,744,936 B1 8/2020 Budhia et al.
2016/0052374 A1 2/2016 Volbracht
2020/0019034 A1 1/2020 Lagowski et al.

FOREIGN PATENT DOCUMENTS

JP 7198416 B2 1/2023

OTHER PUBLICATIONS

Extended European Search Report and Written Opinion issued in European Patent Application No. 24173707.1 dated Nov. 4, 2024, in 10 pages.
Woodford, 'Smart' Windows (electrochromic glass) (8 pages).
Youtube video from MyOnlineCarGuy1 "Electric Window Tint, Adjustable window tint, Variable Electrochromatic Tine. Just Unreal!!" https://www.youtube.com/watch?v=kareReMvxEE.

*Primary Examiner* — Tuyen Tra
(74) *Attorney, Agent, or Firm* — Tucker Ellis LLP

(57) ABSTRACT

Techniques and/or systems are disclosed for a vehicle having one or more windows that each include one or more distinct zones. Each zone is comprised of electrochromic glass and has independently and selectively adjustable light transmission properties. An adaptive window-tinting system operably controls the light transmission properties of the electrochromic glass of one or more zones based at least upon a direction of sunlight with respect to one or more zones of one or more windows. One or more feedback devices that operably provide a feedback signal including data indicative of the direction of sunlight with respect to one or more zones of one or more windows. A control module operably receives the feedback signal and generates a light transmission signal based at least upon the feedback signal that is indicative of a light transmission setting of the electrochromic glass of one or more zones of one or more windows.

15 Claims, 8 Drawing Sheets

500

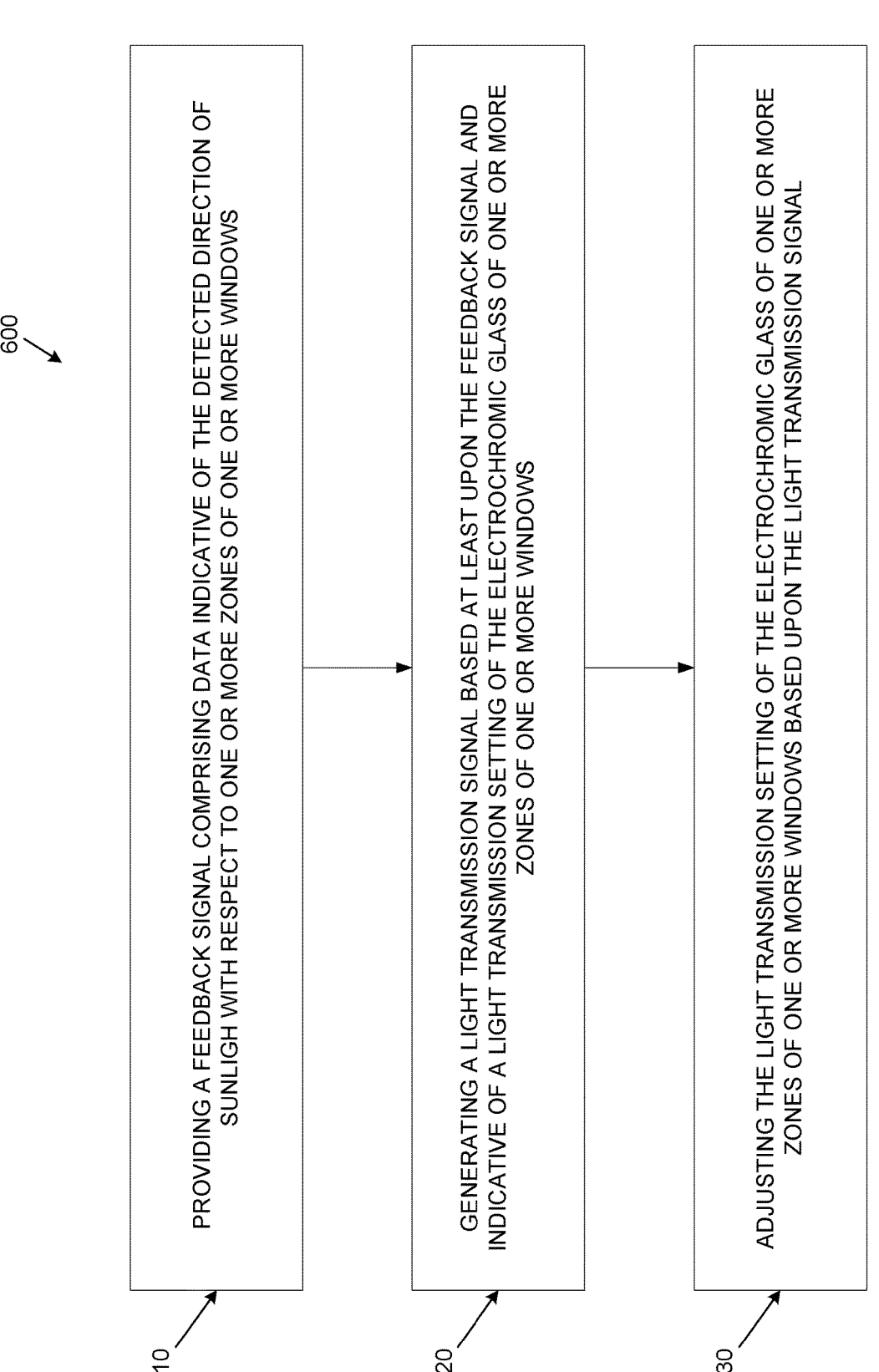

600

610 PROVIDING A FEEDBACK SIGNAL COMPRISING DATA INDICATIVE OF THE DETECTED DIRECTION OF SUNLIGH WITH RESPECT TO ONE OR MORE ZONES OF ONE OR MORE WINDOWS

620 GENERATING A LIGHT TRANSMISSION SIGNAL BASED AT LEAST UPON THE FEEDBACK SIGNAL AND INDICATIVE OF A LIGHT TRANSMISSION SETTING OF THE ELECTROCHROMIC GLASS OF ONE OR MORE ZONES OF ONE OR MORE WINDOWS

630 ADJUSTING THE LIGHT TRANSMISSION SETTING OF THE ELECTROCHROMIC GLASS OF ONE OR MORE ZONES OF ONE OR MORE WINDOWS BASED UPON THE LIGHT TRANSMISSION SIGNAL

FIG. 7

ADAPTIVE WINDOW-TINTING SYSTEM AND METHOD OF USE

BACKGROUND

To limit the amount of sunlight penetrating transparent glass windows a tint is commonly applied to the surface of the transparent glass windows. The window tint generally has a pre-defined, fixed tint, also referred to as opacity level/value. The entire window includes a tint set to the same opacity level/value.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, there is provided a vehicle. The vehicle can comprise one or more windows including one or more distinct zones comprising electrochromic glass. Each zone has independently and selectively adjustable light transmission properties. The vehicle can further comprise an adaptive window-tinting system that operably controls the light transmission properties of the electrochromic glass of one or more zones based at least upon a direction of sunlight with respect to one or more zones of one or more windows. The adaptive window-tinting system can comprise one or more feedback devices that operably provide a feedback signal comprising data indicative of the direction of sunlight with respect to one or more zones of the one or more windows. The adaptive window-tinting system can further comprise a control module that operably receives the feedback signal and generates a light transmission signal based at least upon the feedback signal, the light transmission signal indicative of a light transmission setting of the electrochromic glass of one or more zones of one or more windows.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIG. 7 is a flow diagram illustrating one example implementation of a method for controlling the light transmission properties of one or more distinct zones of one or more windows of a vehicle in accordance with this disclosure.

DETAILED DESCRIPTION

Figure 1:
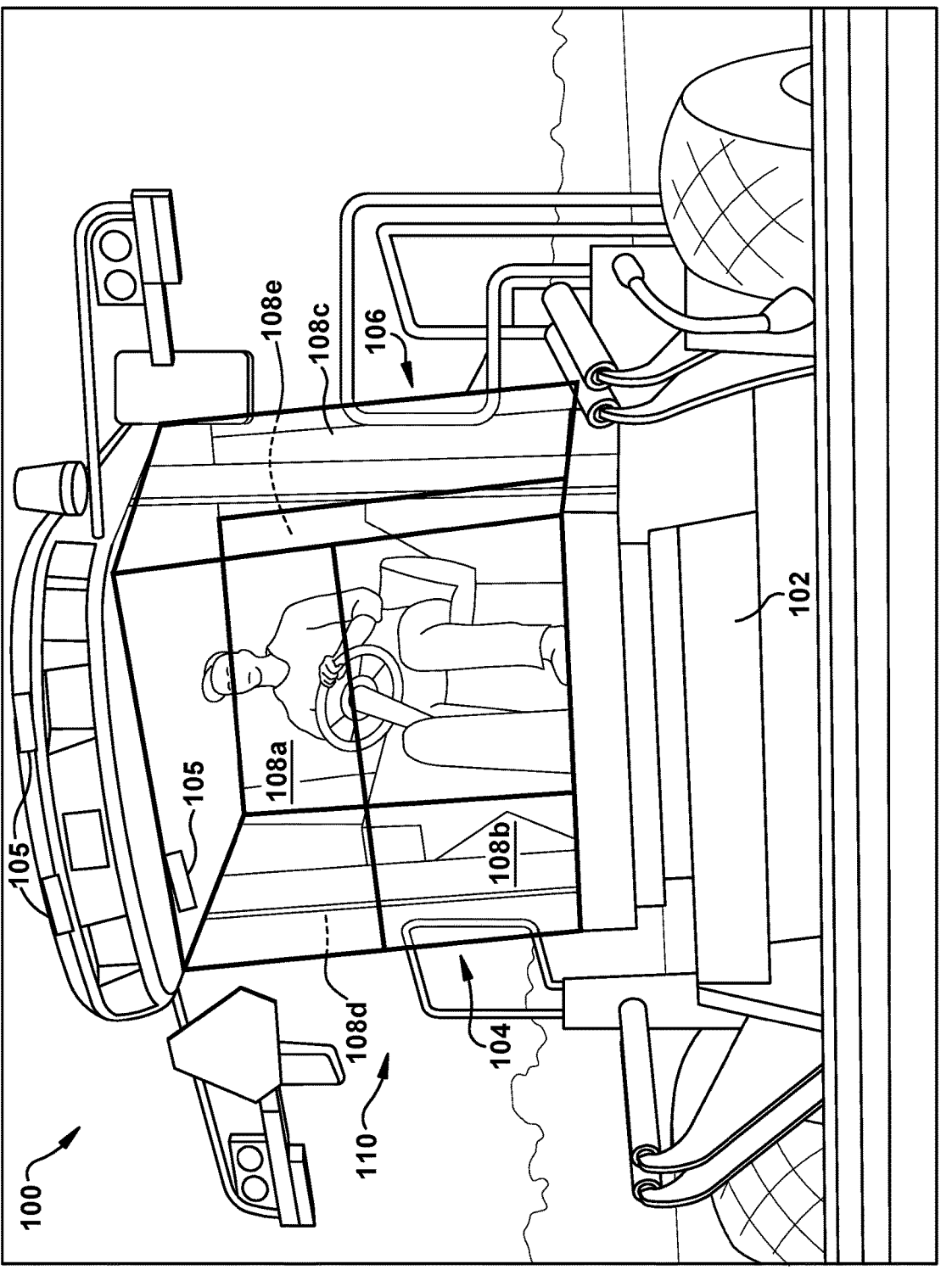
FIG. 1 is a perspective view of an exemplary vehicle including an adaptive window-tinting system in accordance with this disclosure.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

Provided herein is an adaptive window-tinting system and corresponding method for controlling the light transmission properties of one or more distinct zones of one or more windows. The one or more zones can comprise electrochromic glass and each zone can have independently and selectively adjustable light transmission properties. As will be described in more detail below, this disclosure provides a novel system and method for independently and selectively adjusting the light transmission settings of the electrochromic glass of one or more zones based at least upon a direction of sunlight, such as the direction of the sun's rays, with respect to one or more zones of one or more windows. It is to be appreciated the adaptive window-tinting system may automatically adjust the light transmission settings of the electrochromic glass of one or more zones in real time as the direction of sunlight with respect to one or more zones of one or more windows changes with time, for example, by movement of a vehicle comprising the adaptive window-tinting system of this disclosure.

Harvester vehicles, such as self-propelled windrowers (SPW) or self-propelled forage harvesters (SPFH), tend to expose an operator to excessive sunlight and harmful ultraviolet (UV) rays, especially when operating in tropical areas. Excessive sunlight that is incident the glass windows of an operator station, for example incident the front windshield, can cause a glare that affects the operator's visibility through the window and may limit the operator's view in front of the harvester vehicle. Reduced visibility in front of the harvester vehicle limits the operator's ability to manually control (e.g., to effectively steer) and safely operate the harvester vehicle. Further, the excessive sunlight incident the glass windows of the operator station results in more heat entering the operator station thereby resulting in the operator station having an interior temperature that is hot and uncomfortable for the operator. To prevent an increase in temperature inside the operator station and thus maintain a comfortable interior temperature for the operator, increased use of air-conditioning is needed. Air conditioning often represents a waste of energy that costs the operator more money and harms the environment.

Existing solutions to address excessive sunlight incident the transparent glass windows that define the operator station include applying a film tint to the surface of the transparent glass windows. But, the film tint is permanently attached to the glass surface and has a pre-defined, fixed tint or color setting (e.g., fixed to one color), also referred to as opacity level/value. Thus, the permanent film tint cannot be adjusted in real time in response to changes in the direction of sunlight (e.g., the direction of the sun's rays with respect to the glass windows, or the incident angle of the rays of the sun with respect to the glass surface) with respect to the glass windows and/or the intensity of the sunlight incident the glass windows (e.g., the incident angle of the rays of the sun with respect to the glass surface and/or intensity of sunlight as a function of the amount of cover between the sun and the glass windows) because the film tint has a single, fixed opacity value or color setting. Further, the permanent film tint is illegal in certain countries and/or for certain types of vehicle operation. For example, in some countries it is illegal to operate a harvester vehicle with tinted windows on a road, but field use of the harvester vehicle with tinted windows is legal. Additionally, some jurisdictions have regulations setting permissible levels of window tinting (e.g., also referred to as color settings or opacity values/settings) for lawful operation of a vehicle, such as a harvester vehicle. Because the permanent film tint applied to the transparent glass surface comprises a pre-defined, fixed tint value or color setting (e.g., opacity level/value), any changes to the color setting of the film tint requires manual removal of the film tint from the transparent glass windows and replacement with a film tint having a different color setting or opacity value. Removing the film tint from the surface of the transparent glass windows can be a particularly tedious and time consuming endeavor.

The adaptive window-tinting system of this disclosure can be implemented in a vehicle, for example a harvester vehicle such as a self-propelled windrower (SPW) or self-propelled forage harvester (SPFH), to solve the problems associated with existing solutions. The adaptive window-tinting system and corresponding method of this disclosure can be implemented in a vehicle in a manner that complies with local laws governing window tinting (e.g., higher level limits for color setting or opacity value), and protects an operator from excessive sunlight and harmful UV rays. In particular, this disclosure provides for independently and selectively adjusting the light transmission properties of one or more distinct zones of one or more windows based at least upon a direction of sunlight, such as the direction of the sun's rays (e.g., the incident angle of the sun's rays), with respect to one or more distinct zones of one or more windows and, optionally, based further upon the intensity of sunlight incident (e.g., the incident angle of the sun's rays and/or intensity of sunlight as a function of the amount of cover between the sun and the glass windows) one or more zones of one or more windows that define the operator station. That is, for example, the sun's rays may be more intense or excessive as the incident angle approaches normal (e.g., ninety-degrees, or perpendicular, to the glass surface); and the intensity may also be a function of any cover (e.g., clouds, buildings, plants, etc.) between the sun and the window. The one or more distinct zones comprise electrochromic glass and may form the windshield.

The one or more distinct zones comprising electrochromic glass have adjustable light transmission properties that can be adjusted automatically in real time. In some implementations, electrochromic glass replaces the ordinary transparent glass windows, such as those forming the windshield. The adaptive window-tinting system and method of this disclosure can be effectively implemented in a vehicle, such as a harvester vehicle, to reduce glare and to help regulate the temperature inside the operator station where the operator is located by changing the color (i.e., transparency/opacity) of the electrochromic glass to a darker color (e.g., blueish color) that is more opaque to reflect more sunlight and, by extension, transmit less sunlight. In this manner, the electrochromic glass can cut peak energy use for cooling the interior of the operator station while providing exceptional convenience since the light transmission properties of one or more distinct zones comprising electrochromic glass can be automatically, independently, and selectively adjusted based at least upon a direction of sunlight, such as the direction of the sun's rays, with respect to one or more distinct zones comprising electrochromic glass and, further, based on the intensity of sunlight incident one or more zones of one or more windows that define the operator station, the one or more zones comprising electrochromic glass. That is, for example, the tinting of the glass may increase as the incident angle of the sun's rays approaches normal with respect to the glass surface. In this way, for example, the tinting of the glass may be at its highest when the sun's rays are at a normal incident angle (e.g., ninety-degrees or perpendicular) to the glass surface, and may decrease in tint value as the incident angle moves away from normal.

Referring now to FIGS. 1 through 6, there are illustrated example implementations of an adaptive window tinting-system system, indicated generally at 110 and 310, for controlling the light transmission properties of one or more distinct zones of one or more windows of a vehicle 100, 300 (e.g., harvester vehicle) in accordance with this disclosure. The vehicle 100, 300 may have one or more windows that each include one or more distinct zones comprising electrochromic glass. The light transmission properties of the electrochromic glass of one or more distinct zones can be independently and selectively adjustable. As described in detail below, the adaptive window-tinting system 110, 310 can be configured to operably control the light transmission properties of the electrochromic glass of one or more distinct zones based at least upon a direction of sunlight, such as the direction of the sun's rays or incident angle of the sun's rays, with respect to one or more zones of one or more windows of the vehicle 100, 300 and, optionally, further based on the intensity of sunlight (e.g., incident angle of the sun's rays and/or intensity of sunlight as a function of the amount of cover between the sun and the glass windows) incident one or more zones of one or more windows. For example, intensity may be a function of the incident angle of the sun's rays (e.g., more intense closer to normal), and/or of any cover that may be disposed between the sun and the target window.

Figure 2:
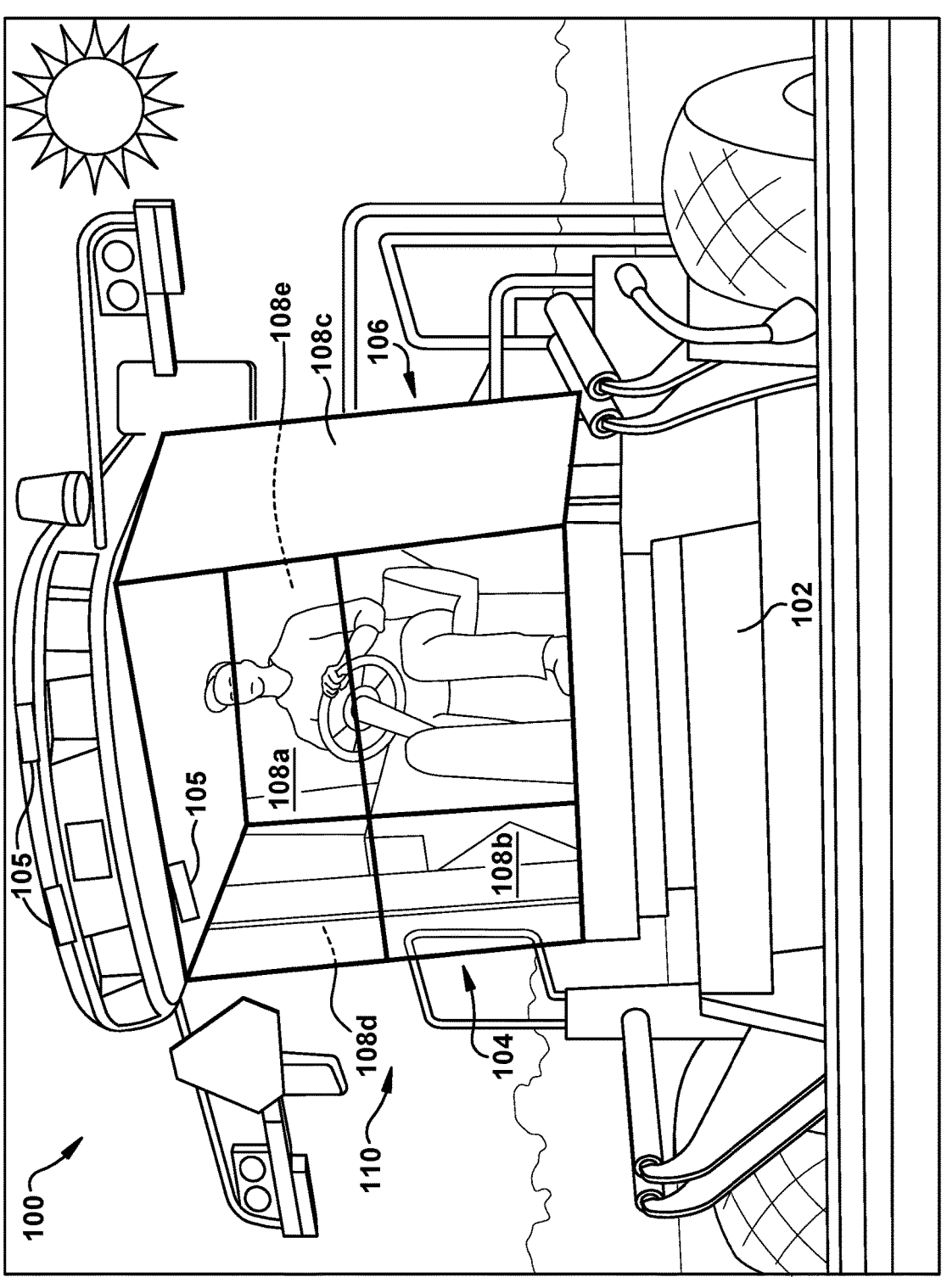
FIG. 2 is a perspective view of the vehicle shown in FIG. 1 in which the adaptive window-tinting system is actively employed in accordance with this disclosure.

FIGS. 1 and 2 show an example implementation of the adaptive window-tinting system 110 incorporated in a vehicle 100 in accordance with this disclosure. The adaptive window-tinting system 110 is not limited to any particular type of vehicle and can be incorporated in a self-propelled vehicle including, but not limited to, automobiles, motorcycles, aircraft, watercraft, snowmobiles, trucks, tractors, lawn mowers, and harvesters among others. In some implementations, the vehicle 100 is a harvester vehicle. In one non-limiting example, the harvester vehicle is a self-propelled windrower (SPW) for harvesting grain by cutting grain and laying the stalks in windrows for later threshing and cleaning. In another non-limiting example, the harvester vehicle is a self-propelled forage harvester (SPFH) that is a farm implement that harvests forage plants to make silage. But, other types of vehicles, including other types of harvester vehicles, are contemplated by this disclosure.

In this particular implementation, the vehicle 100 is a harvester vehicle comprising a chassis 102 that is supported by front wheels and rear wheels although other support is contemplated such as tracks. The vehicle 100 is adapted for movement through a field to harvest grain (e.g., SPW), to harvest forage plants (e.g., SPFH), or to harvest other types of crops or plant material. The chassis 102 may support a power module, such as an engine. Water, lubricant, and fuel tanks (not shown) may be supported in and on the chassis 102.

An operator station 104 may be supported by the chassis 102. The operator station 104 is configured to house an operator. The operator station 104 may be at least partially defined by one or more windows, collectively at 106. In some implementations, the one or more windows 106 may form the windshield of the vehicle 100. Each of the one or more windows 106 may include one or more distinct zones 108a-108e comprising electrochromic glass. In some implementations, the one or more windows 106 including one or more distinct zones 108a-108e are themselves comprised of electrochromic glass. In other implementations, the one or more windows 106 that include the one or more distinct zones 108a-108e are themselves ordinary transparent glass windows with an electrochromic glass film applied over the ordinary glass windows. The light transmission properties of the electrochromic glass of one or more distinct zones 108a-108e can be independently and selectively adjustable. As described in more detail below, the adaptive window-tinting system 110 can be configured to operably control the light transmission properties of the electrochromic glass of one or more distinct zones 108a-108e based at least upon a direction of sunlight, such as the direction of the sun's rays or the incident angle of the sun's rays, with respect to one or more zones 108a-108e of one or more windows 110 of the vehicle 100 and, optionally, further based on the intensity of sunlight (e.g., the incident angle of the sun's rays and/or intensity of sunlight as a function of the amount of cover between the sun and the glass windows) incident one or more zones 108a-108e of one or more windows 106.

In some implementations, the operator station 104 may be partially defined by a single continuous window (e.g., a single window panel). The single continuous window may include a plurality of distinct zones comprising electrochromic glass. In other implementations, the operator station 104 may be partially defined by a plurality of windows that each include one or more distinct zones comprising electrochromic glass. In FIGS. 1 and 2, the vehicle 100 is a harvester vehicle comprising an operator station 104 that is partially defined by a plurality of windows 106 that together include five distinct zones 108a-108e comprising a first zone 108a, a second zone 108b, a third zone 108c, a fourth zone 108d, and a fifth zone 108e, wherein each zone 108a-108c comprises electrochromic glass. In this particular implementation, the front window, or front windshield, has two distinct zones comprising the first zone 108a and the second zone 108b. It is to be appreciated that the one or more windows 106 are not limited to any specific number of distinct zones.

Figure 5:
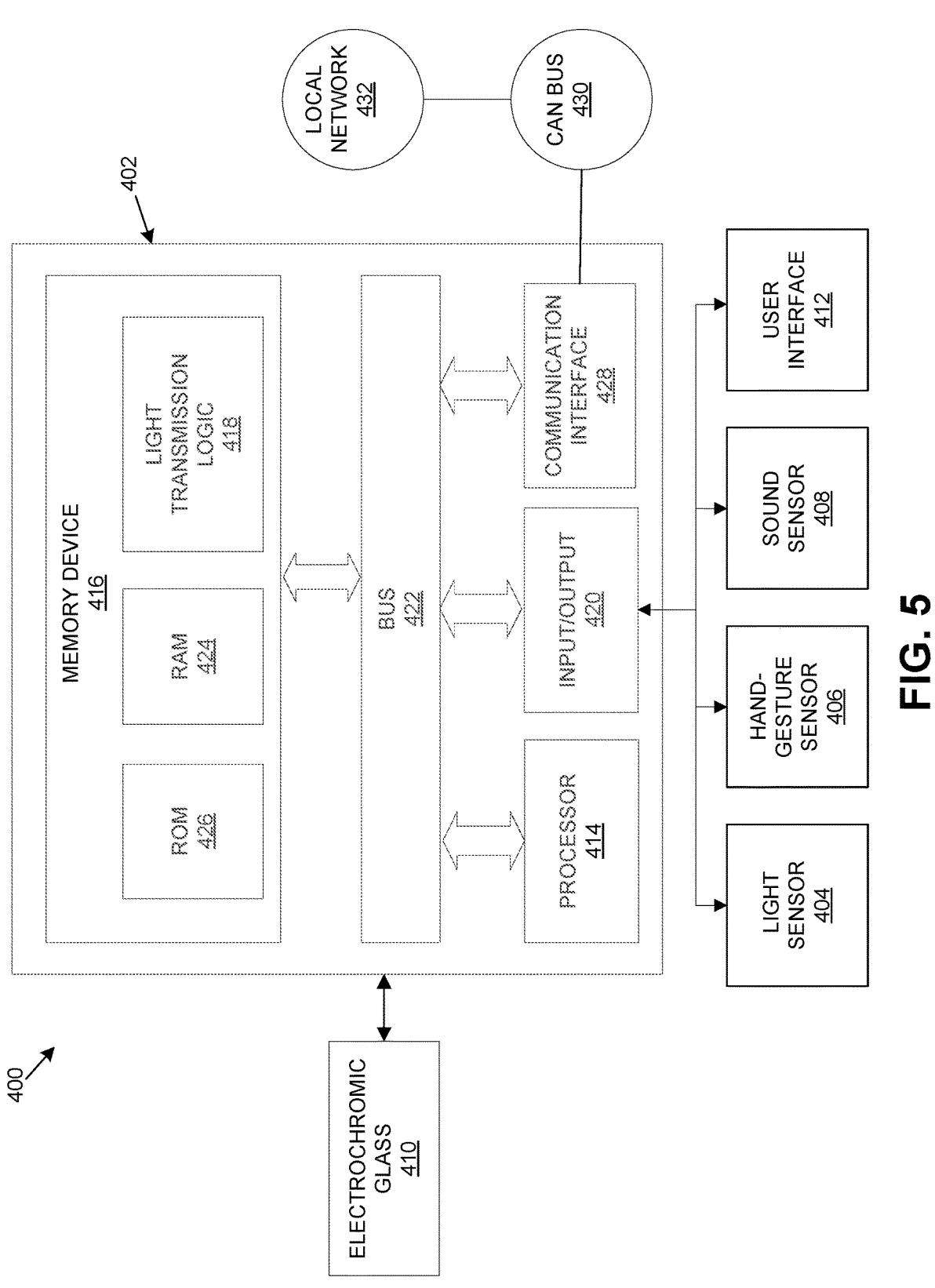
FIG. 5 is a schematic diagram illustrating an example implementation of an adaptive window-tinting system for controlling the light transmission properties of one or more distinct zones of one or more windows of a vehicle in accordance with this disclosure.

The adaptive window-tinting system 110 further comprises one or more feedback devices 105, or sensors (e.g., 404, 406, 408 of FIG. 5). The one or more feedback devices 105, or sensors (e.g., 404, 406, 408 of FIG. 5), can be provided to monitor conditions such as, for example, the direction of the sunlight (e.g., the direction of the sun's rays or the incident angle of the sun's rays) with respect to one or more zones 108a-108e of one or more windows 106 and/or the brightness or intensity of sunlight (e.g., the incident angle of the sun's rays and/or intensity of sunlight as a function of the amount of cover between the sun and the glass windows) incident one or more zones 108a-108e of one or more windows 106. The feedback devices 105, or sensors, may be attached to or mounted on the vehicle 100. In some implementations, the one or more feedback devices 105 can be coupled to, or mounted on, the exterior of the harvester vehicle 100, as shown in FIGS. 1 and 2.

FIGS. 1 and 2 provide an example implementation in which the one or more feedback devices 105 comprise light sensors mounted to the exterior of the harvester vehicle 100 and configured to monitor, or detect, a direction of sunlight (e.g., the direction of the sun's rays) with respect to one or more zones 108a-108e of one or more windows 106 of the vehicle 100, the one or more zones 108a-108e comprising electrochromic glass. The light sensors can be further configured to generate a signal representative of the data of the monitored condition such as by providing, to a control module (e.g., 314 of FIG. 4), a feedback signal comprising data indicative of the direction of sunlight with respect to one or more zones 108a-108e of one or more windows 106. In particular, the one or more light sensors can be configured to generate a signal representative of the data indicative of the direction of sunlight (e.g., direction of the sun's rays) with respect to the light sensor and, by extension, with respect to one or more zones 108a-108e of one or more windows 106 based on their geographic orientation relative to the one or more light sensors. In some implementations, the light sensors, commonly known as photoelectric devices or photo sensors, may comprise sun sensors. In some implementations, the one or more light sensors may be included in a sensor bank.

It is to be appreciated that this disclosure is not limited to any particular type of light sensor, or photoelectric device, as long as the light sensor is configured to carry out this disclosure. As a non-limiting example, the one or more light sensors can comprise photoemissives, photoconductors (e.g., photoresistors), photojunction devices (e.g., photodiodes and phototransistors), photovoltaics, sun sensors, and combinations thereof among others. In some implementations, the light sensors can be included in a light sensor bank.

In some implementations, the one or more feedback devices 105 can comprise light sensors configured to monitor, or detect, an intensity of sunlight incident one or more distinct zones 108a-108e of one or more windows 106 of the vehicle 100, the one or more zones 108a-108e comprising electrochromic glass. The light sensors can be further configured to generate a signal representative of the data of the monitored condition such as by providing, to a control module (e.g., 314 of FIG. 4), a feedback signal comprising data indicative of the intensity of sunlight incident one or more zones 108a-108e of one or more windows 106. In particular, the one or more light sensors can be configured to generate a signal representative of the data indicative of the intensity of incident sunlight over a predefined area on the surface of the respective light sensor and, by extension, with respect to one or more zones 108a-108e of one or more windows 106 based on their geographic orientation relative to the one or more light sensors. As an example, the light sensors can be configured to measure solar irradiance for determining the intensity of incident sunlight, which can then be used to determine the direction of the sunlight and/or to determine the degree of window-tinting when adjusting the light transmission settings of the electrochromic glass of one or more distinct zones. As an example, sunlight intensity data indicating a higher intensity of sunlight incident one or more distinct zones of the one or more windows, for example the third zone 108c of FIG. 2, can be indicative sunlight is being directed incident the third zone 108c comprising electrochromic glass (i.e., more direct sunlight is incident the zone) and, in response, the adaptive window-tinting system 110 may independently and selectively adjust the light transmission settings of the electrochromic glass of one or more zones, for example the third zone 108c, to a darker, more opaque color, as shown in FIG. 2.

In some implementations, the one or more feedback devices 105 can further comprise one or more sensors configured to detect hand gestures made by the operator and to generate a signal representative of the detected hand gestures. In these implementations, a specific hand gesture can be assigned to indicate a particular or unique zone of one or more windows 106. As an example, the one or more sensors for detecting hand gestures can be configured to detect specific (e.g., designated) hand gestures that are each indicative of a particular zone of the one or more windows 106 of the vehicle 100 and to generate a signal representative of the detected hand gesture for adjusting the light transmission setting of the electrochromic glass for the particular zone. The one or more sensors for detecting hand gestures can comprise a camera, but are not so limited, and may be disposed inside the operator station 104.

In some implementations, the one or more feedback devices 105 can further comprise one or more sensors configured to detect sound such as, for example, voice commands by the operator, and to generate a signal representative of the detected voice commands. In these implementations, a specific voice command can be assigned to indicate a particular, or unique zone of one or more windows 106. As an example, the one or more sensors for detecting sound can be configured to detect specific (e.g., designated) voice commands that are each indicative of a particular zone of one or more windows 106 of the vehicle 100 and to generate a signal representative of the detected voice command for adjusting the light transmission setting of the electrochromic glass for the particular zone. The one or more sensors for detecting voice commands may be disposed inside the operator station 104.

In some implementations, each of the one or more distinct zones 108a-108e comprising electrochromic glass has independently and selectively adjustable light transmission properties. The adjustable light transmission properties of the electrochromic glass are based on the scientific principle of electrochromism, in which materials change color (or switch from transparent to opaque) under electric control, such as by applying an electrical voltage across the material. As an example, a small electrical voltage can be applied to two electrodes of the electrochromic glass of a distinct zone to cause ions to migrate from a first electrode, such as an innermost electrode, to a second electrode, such as an outer electrode, where the ions congregate, effectively turning the electrochromic glass opaque (e.g., blueish and dark) so that it reflects more sunlight and, by extension, transmits less sunlight. The ions may remain at the second electrode until the voltage is reversed, causing the ions to migrate back to the first electrode so that the electrochromic glass of the distinct zone turns transparent once again. It is to be appreciated that no power may be needed to maintain the electrochromic glass in a clear, transparent state or dark, opaque state—only to change the electrochromic glass from one state to the other state. In yet another example, the electrochromic glass may change color from a clear, transparent color to a darker, more opaque color, such as a blueish color, by instead passing a current through the electrochromic glass.

The light transmission properties of the electrochromic glass of one or more distinct zones 108a-108e may be independently and selectively adjusted based at least on the direction of sunlight (e.g., the sun's rays) with respect to one or more distinct zones 108a-108e comprising electrochromic glass. In some implementations, the light transmission properties of the electrochromic glass of one or more distinct zones 108a-108e may be independently and selectively adjusted further based on the intensity of sunlight incident one or more distinct zones 108a-108e comprising electrochromic glass. FIG. 2 shows the adaptive window-tinting system 110 being used to independently and selectively adjust the light transmission properties of the electrochromic glass of the third zone 108c using electric control—for example, by selectively applying a small voltage to the electrochromic glass of the third zone 108c—based at least on the sunlight, or the sun's rays, being directed at (or incident to) the third zone 108c of the one or more windows 106 of the vehicle 100. To protect the operator from excessive sunlight and harmful UV rays, the adaptive window-tinting system 110 is used to independently and selectively adjust the light transmission properties of the electrochromic glass of the third zone 108c by changing the color, or opacity, of the electrochromic glass from clear and transparent to opaque and dark blue.

Figure 3:
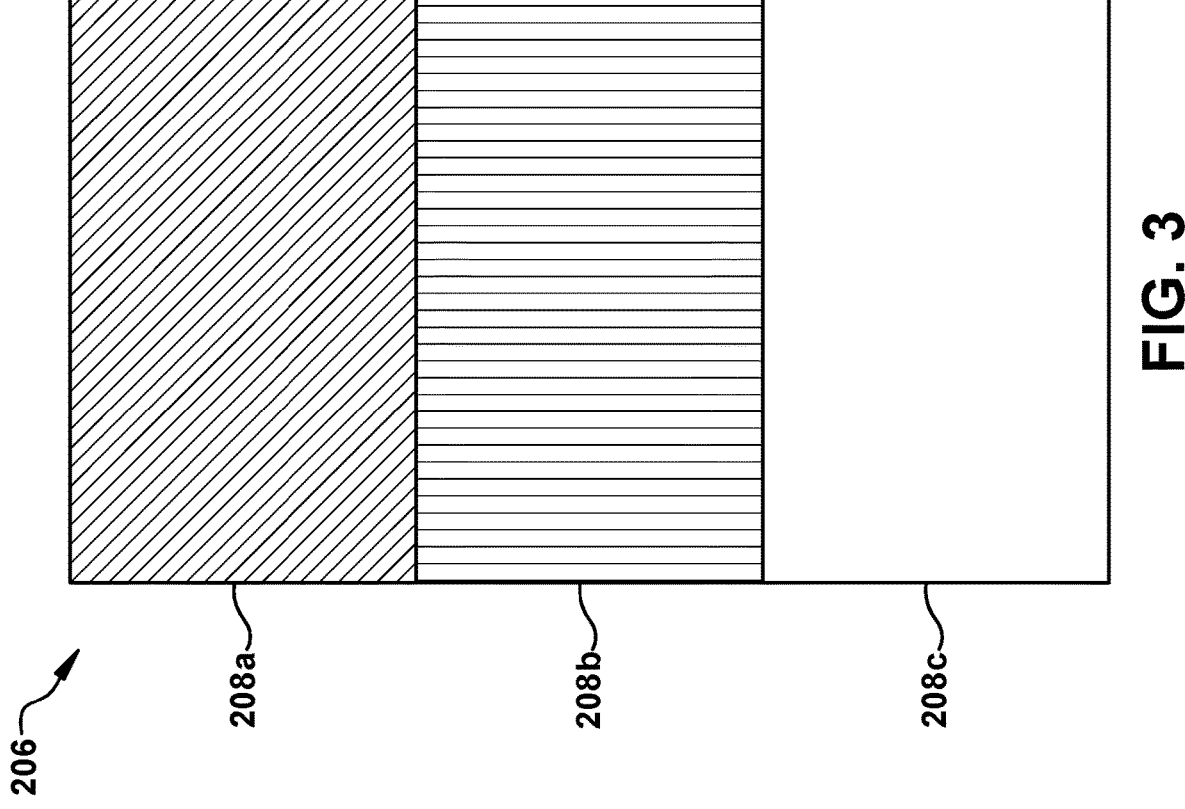
FIG. 3 is a schematic illustration of a front window of a vehicle under the control of the adaptive window-tinting system in accordance with this disclosure.

FIG. 3 shows another example implementation of the adaptive window-tinting system 110 being used to independently and selectively adjust the light transmission properties of the electrochromic glass of a window 206, such as a front windshield, comprising three distinct zones 208a-208c. In this particular implementation, the front window 206, or front windshield, includes three distinct zones 208a-208c comprising a first zone 208a, a second zone 208b, and a third zone 208c arranged sequentially with the first zone 208a positioned at the top of the front window 206 and the third zone 208c positioned at the bottom of the front window 206. The adaptive window-tinting system 110 of this disclosure can independently and selectively adjust the light transmission properties of the electrochromic glass of the three zones 208a-208c of the window 206 using electric control—for example, by selectively applying a small voltage to the electrochromic glass of particular zones with the voltage magnitude being directly proportional to the amount of tinting of the electrochromic glass—based at least on the direction of sunlight (e.g., the direction of the sun's rays) with respect to the zones 208a-208c of the window 206 and, optionally, further based on the intensity of sunlight incident one or more zones 208a-208c of the window 206.

Referring still to FIG. 3 or the purpose of illustration and not limitation, assume more sunlight is directed at, or incident to, the first zone 208a than the second zone 208b or third zone 208c, and more sunlight is directed at, or incident to, the second zone 208b than the third zone 208c. Further, assume that the intensity of sunlight incident the first zone 208a is greater than the intensity of sunlight incident the second zone 208b or the third zone 208c, and the intensity of sunlight incident the second zone 208b is greater than the intensity of sunlight incident the third zone 208c. Then, the adaptive window-tinting system 110 of this disclosure can be used to independently and selectively adjust the light transmission properties of one or more zones 208a-208c of the front window 206 by independently and selectively adjusting the light transmission settings of the electrochromic glass of one or more zones 208a-208c of the window 206 such as, for example, by changing the color, or opacity, of the electrochromic glass of the first zone 208a to be more opaque, or darker blue, than that of the second zone 208b and third zone 208c, and, similarly, by changing the color, or opacity, of the electrochromic glass of the second zone 208b to be more opaque, or darker blue, than that of the third zone 208c. In this particular implementation, the adaptive window-tinting system 110 does not adjust the light transmission settings of the electrochromic glass of the third zone 208c and, as a result, the electrochromic glass of the third zone 208c remains clear and transparent. It may be beneficial to keep the electrochromic glass of the third zone 208c clear and transparent in order to see the harvesting equipment through the window 206, such as the header of a crop harvester, and to observe harvesting equipment performance through the window 206 clearly without interference from window tinting.

It is to be appreciated that the magnitude (e.g., amount) of voltage applied to the electrochromic glass is directly proportional to the light transmission setting of the zone (i.e., the amount of window tinting) with a greater voltage resulting in a light transmission setting comprising a darker color of greater opacity. As an example, a higher voltage would be applied to the first zone 208a to adjust the light transmission setting to a darker color than would be applied to the second zone 208b and/or third zone 208c. For example, 5V DC can be applied to the electrochromic glass of the first zone 208a to adjust the light transmission setting of the first zone 208a to 70% tinting. But, 3V DC can be applied to the electrochromic glass of the second zone 208b to adjust the light transmission setting of the second zone 208b to 40% tinting.

In some implementations, the adaptive window-tinting system may further comprise a user interface 112. The user interface 112 may be positioned inside the operator station 104 where it is accessible to the operator. In some implementations, the operator may access the user interface 112 to independently and selectively adjust light transmission properties of one or more zones comprising electrochromic glass.

Figure 4:
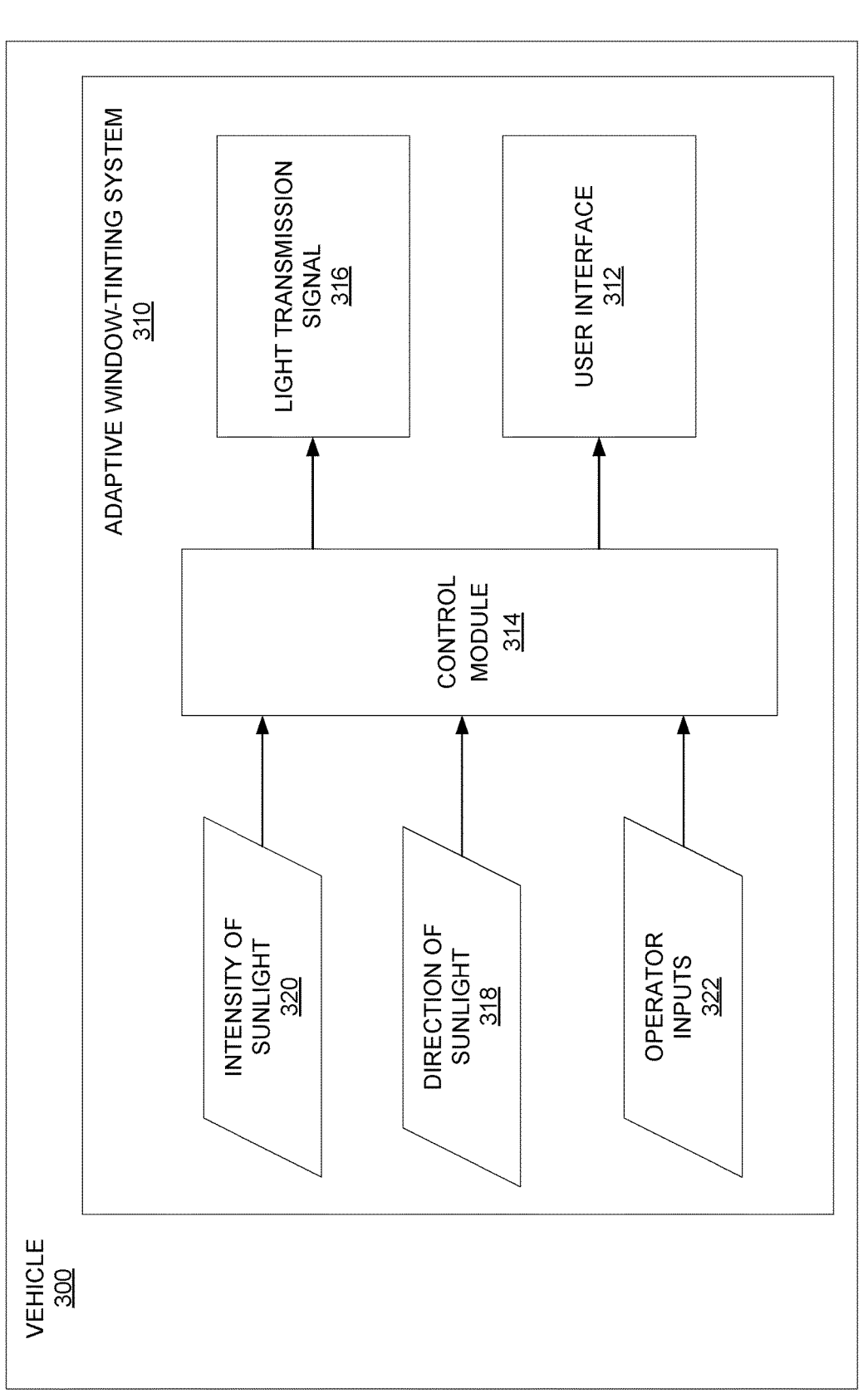
FIG. 4 is a block diagram illustrating an example implementation of an adaptive window-tinting system in a vehicle in accordance with this disclosure

FIG. 4 is a block diagram illustrating an example implementation of an adaptive window-tinting system 310 (e.g., 110 of FIGS. 1, 2 respectively) incorporated in a vehicle 300, such as a harvester vehicle, in accordance with this disclosure. The adaptive window-tinting system 310 comprises a control module 314 that is operably coupled with the electrochromic glass of one or more distinct zones of one or more windows of the vehicle 300.

In some implementations, the adaptive window-tinting system 310 is operably coupled with a user interface 312. The user interface 312 may be positioned in the operator station (e.g., 104 of FIGS. 1, 2). The user interface 312 can be configured to display information about the status of one or more distinct zones of one or more windows of the vehicle. In particular implementations, the user interface 312 can be configured to display the real time light transmission settings and associated light transmission properties corresponding to one or more distinct zones comprising electrochromic glass. In some implementations, the user interface 312 can be an interactive display. The operator can review the light transmission settings provided by the control module 314 and may manually override the automated light transmission setting in favor of an operator-defined light transmission setting. In this way, the operator may use the user interface 312 to independently and selectively adjust the light transmission properties of one or more zones comprising electrochromic glass.

The adaptive window-tinting system 310 comprises a control module 314 operably coupled with one or more feedback devices for receiving data from the one or more feedback devices, or sensors. In some implementations, the control module 314 can be configured to operably receive feedback signals comprising data representative of (or indicative of): (i) a direction of sunlight (e.g., the direction of the sun's rays) 318 with respect to one or more distinct zones of one or more windows of the vehicle 300; and, optionally, (ii) an intensity of sunlight 320 incident one or more distinct zones of one or more windows of the vehicle 300; and (iii) an operator input 322 such as the voice command and/or hand gesture described in detail below. The one or more feedback devices, or sensors, can be configured to generate a signal representative of data of the monitored conditions such as by providing a feedback signal to the control module 314 comprising data indicative of: (i) the direction of sunlight with respect to one or more zones of one or more windows; and (ii) the intensity of sunlight incident one or more zones of one or more windows.

The control module 314 operably receives the feedback signal 318, 320, and 322 and generates a light transmission signal 316 based at least upon the feedback signal 318, 320, and 322, wherein the light transmission signal 316 is indicative of a light transmission setting of the electrochromic glass of one or more zones of one or more windows. In this manner, the adaptive window-tinting system 310 is configured to operably control the light transmission properties of one or more distinct zones comprising electrochromic glass by automatically adjusting the light transmission setting of the electrochromic glass of one or more distinct zones based at least upon the direction of sunlight with respect to one or more zones of one or more windows.

In some implementations, the control module 314 can comprise a controller. The controller can comprise a processor, a memory device operably coupled with the processor, and control module logic, or light transmission logic (e.g., programmable logic), stored in the memory device, the control module logic being executable by the processor to generate a light transmission signal 316 based at least upon the feedback signal 318, 320, and 322, the light transmission signal 316 indicative of a light transmission setting of the electrochromic glass of one or more zones of one or more windows. In some implementations, the control module 314 can comprise logic (e.g., programmable logic) that is stored either on a control device of the adaptive window-tinting system 310 or on another control unit in the vehicle 300. The control module logic is executable by the processor and configured to generate the light transmission signal 316 based at least upon the feedback signal 318, 320, and 322.

FIG. 5 is a schematic diagram illustrating an example implementation of an adaptive window-tinting system 400 for controlling the light transmission properties of one or more distinct zones of one or more windows of a vehicle (e.g., vehicle 100 of FIGS. 1, 2; 300 of FIG. 4). The one or more distinct zones comprises electrochromic glass. The adaptive window-tinting system 400 comprises a control device 402, such as a programmable controller, operably coupled with one or more feedback devices that can comprise one or more sensors 404, 406, and 408. The control device 402 is also operably coupled with the electrochromic glass 410 of one or more zones of the vehicle. In some implementations, the control device 402 In use, the adaptive window-tinting system 400 is configured to operably control the light transmission properties of one or more distinct zones comprising electrochromic glass based at least upon a direction of sunlight with respect to one or more zones of one or more windows of the vehicle.

In some implementations, the adaptive window-tinting system 400 is configured to operably control the light transmission properties of one or more distinct zones comprising electrochromic glass by automatically adjusting the light transmission setting of one or more distinct zones comprising electrochromic glass based at least upon the direction of sunlight with respect to one or more zones of one or more windows. In some implementations, the adaptive window-tinting system 400 includes a default setting that prevents adjusting the light transmission setting of the electrochromic glass of one or more zones to a window-tinting value or setting (e.g., opacity setting/level)—for example, to a certain color darkness setting such as tinting to full black—proscribed by local law (e.g., prevented from tinting glass full black). The maximum opacity value for the light transmission setting may be a manufacturer setting that is specific to each country to facilitate compliance with local laws governing window tinting.

In some implementations, the control device 402 can be operably coupled with a user interface 412. The user interface 412 can be configured to display information about the status of one or more distinct zones of one or more windows of the vehicle. In particular implementations, the user interface 412 can be configured to display the real time light transmission settings and associated light transmission properties corresponding to one or more distinct zones comprising electrochromic glass.

In some implementations, the user interface 412 can be an interactive display. In these implementations, the operator can review the current light transmission settings of the electrochromic glass of one or more distinct zones and can manually adjust the light transmission settings of the electrochromic glass of one or more distinct zones. As an example, an operator may determine that the adaptive window-tinting system 400, when automatically adjusting the light transmission settings of one or more distinct zones comprising electrochromic glass based at least upon the direction of sunlight with respect to one or more zones of one or more windows, does not provide a light transmission setting sufficient to meet the operator's preferences for protection from excessive sunlight and harmful UV rays. In these instances, the operator may override the automatic adjustment, provided by the adaptive window-tinting system 400, of the light transmission settings of the electrochromic glass of one or more distinct zones by manually setting the light transmission setting for one or more distinct zones of one or more windows of the vehicle.

In some implementations, the user interface 412 includes a touch screen display and the operator can selectively adjust the light transmission settings of one or more zones by selectively touching a particular zone or zones depicted on the touch screen display. For example, the operator may activate tinting of specific window zones by selectively touching window zones depicted on the touch screen display. In some implementations, the operator may not be permitted to set the light transmission properties of one or more zones comprising electrochromic glass to exceed a certain opacity value such that the operator is limited to setting the light transmission setting for one or more zones to a bounded, predefined range (e.g., programmed into the system as a default setting). As an example, the operator may be prevented from setting the light transmission properties of any one or more distinct zones above a predetermined threshold so that the electrochromic glass cannot be fully tinted such as, for example, to the color black. The maximum opacity value for the light transmission setting may be a factory preset corresponding to an opacity value specific to each country to facilitate compliance with local laws governing window tinting.

The adaptive window-tinting system 400 can comprise one or more feedback devices, or sensors 404, 406, and 408. The one or more feedback devices can be one or more sensors 404, 406, and 408 configured to monitor, or detect, a condition indicative of the direction of sunlight with respect to one or more zones of one or more windows of the vehicle and to generate a signal representative of the data of the monitored condition. In some implementations, the one or more feedback devices can comprise one or more sensors, such as light sensors (also referred to as photoelectric devices or photo sensors) 404, configured to monitor the direction of sunlight with respect to one or more distinct zones of one or more windows and to generate a signal comprising data indicative of the direction of sunlight with respect to one or more zones of one or more windows. In some implementations, the one or more feedback devices can comprise one or more light sensors 404 configured to monitor, or detect, an intensity of sunlight incident one or more distinct zones comprising electrochromic glass and to generate a signal comprising data indicative of the intensity of sunlight incident one or more zones of one or more windows.

In some implementations, the one or more feedback devices can further comprise one or more sensors 406 configured to detect hand gestures made by the operator and to generate a signal representative of the detected hand gestures. In these implementations, a specific hand gesture can be assigned to indicate a particular, or unique zone of one or more windows. As an example, the one or more sensors 406 for detecting hand gestures can be configured to detect specific (e.g., designated) hand gestures that are each indicative of a particular zone of the one or more windows of the vehicle and to generate a signal representative of the detected hand gesture. In some implementations, the one or more sensors 406 configured to detect hand gestures include a camera. It is to be appreciated that the adaptive window-tinting system 400 can be configured to recognize a particular hand gesture and to associate the hand gesture with a particular zone assigned to the specific hand gesture for reasons such as adjusting the light transmission setting of the electrochromic glass of the particular zone indicated by the hand gesture.

Figure 6:
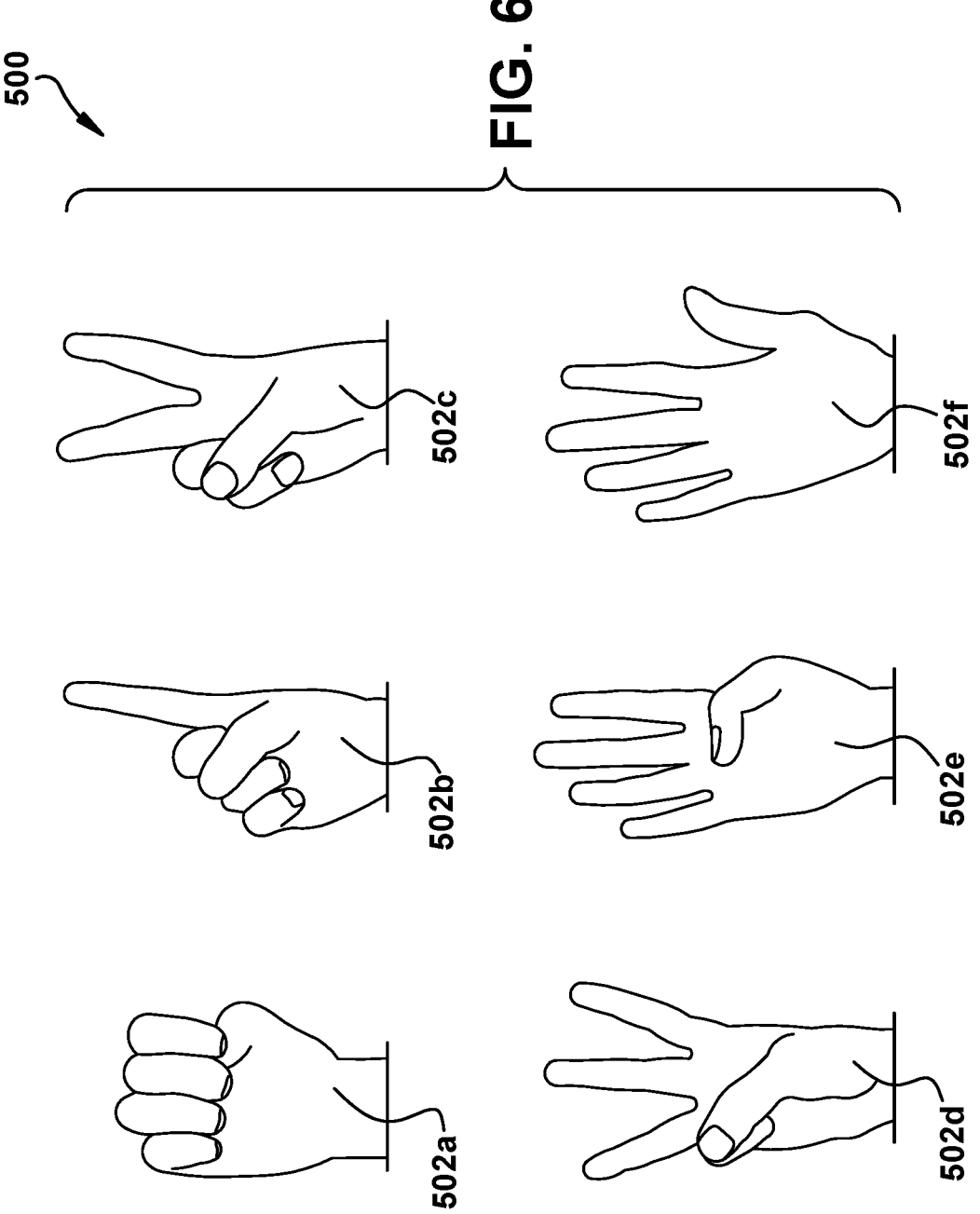
FIG. 6 is a set of pictures providing an example implementation of hand gestures for use in an adaptive window-tinting system of a vehicle in accordance with this disclosure.

FIG. 6 shows a set of different hand gestures with each unique hand gesture assigned to designate, or be associated with, a specific zone of the one or more windows. In this particular example implementation, included for the purposes of illustration and not limitation, the hand gesture for zero 502a is assigned to indicate a first zone, the hand gesture for one 502b is assigned to indicate a second zone, the hand gesture for two 502c is assigned to indicate a third zone, the hand gesture for three 502d is assigned to indicate a fourth zone, the hand gesture for four 502e is assigned to indicate a fifth zone, and the hand gesture for five 502f is assigned to indicate a sixth zone. In use, one or more sensors 406 can detect an operator making the hand gesture for two indicative of the third zone of the one or more windows of the vehicle and can generate a signal representative of the hand gesture for two, which is recognized by the adaptive window-tinting system 400 as being associated with the third zone of the one or more windows.

In some implementations, the one or more feedback devices can further comprise one or more sensors 408 configured to detect sound such as, for example, voice commands by the operator, and to generate a signal representative of the detected voice commands. In these implementations, a specific voice command can be assigned to indicate a particular, or unique zone of the one or more windows. As an example, the one or more sensors 408 for detecting sound can be configured to detect specific (e.g., designated) voice commands that are each indicative of a particular zone of the one or more windows of the vehicle and to generate a signal representative of the detected voice command for adjusting the light transmission setting of the electrochromic glass for the particular zone. In this manner, the one or more feedback devices operably provide feedback signals, to the control device, comprising voice command data indicative of one or more zones of one or more windows. It is to be appreciated that the adaptive window-tinting system 400 can be configured to recognize the particular voice command detected and to associate the voice command with the particular zone assigned to the specific voice command for reasons such as adjusting the light transmission setting of the electrochromic glass of the particular zone indicated by the voice command. The one or more sensors 408 for detecting sound can be configured to detect designated voice commands that are each indicative of a unique zone of the one or more windows.

Similar to the hand gesture designations shown and discussed with respect to FIG. 6, each unique voice command can be assigned to designate, or be associated with, a particular zone of the one or more windows. As a non-limiting example, the voice command "zero" can be assigned to indicate a first zone, the voice command "one" can be assigned to indicate a second zone, the voice command "two" can be assigned to indicate a third zone, the voice command "three" can be assigned to indicate a fourth zone, and the voice command "four" can be assigned to indicate a fifth zone. As an example, one or more sensors 408 can detect an operator providing the voice command "two" indicative of the third zone of the one or more windows of the vehicle and can generate a signal representative of the voice command "two", which is recognized by the adaptive window-tinting system 400 as being associated with the third zone of the one or more windows.

In some implementations, the control device 402 comprises a processor 414, a memory device 416 operably coupled with the processor 414, and control module logic 418, or light transmission logic, stored in the memory device 416, the control module logic 418 (or light transmission logic) being executable by the processor 414 to generate the light transmission signal based at least upon the feedback signal. The control device (or control module) 402 operably receives the feedback signal provided by one or more feedback devices, or sensors 404, 406, and 408, and generates a light transmission signal based at least upon the feedback signal, the light transmission signal indicative of a light transmission setting of the electrochromic glass 410 of one or more zones of one or more windows. The control device 402 can provide, to the appropriate electrochromic glass 410 of one or more zones, the light transmission signal indicative of the light transmission setting for the electrochromic glass 410 of each of the one or more zones.

In some implementations, the control device 402 (e.g., a programmable controller) can comprise an input/output 420 for receiving, as input, the feedback signal from one or more feedback devices (e.g., sensors 404, 406, and 408) and for providing, as output, data indicative of a light transmission setting of the electrochromic glass of one or more zones of the vehicle. In some implementations, the control device 402 can be programmed to automatically provide data indicative of the light transmission setting to the electrochromic glass 410 of one or more zones of one or more windows to automatically carry out adjustment of the light transmission settings (e.g., tinting) of one or more zones of one or more windows. In FIG. 2, the sun's rays are directed at, or incident to, the third zone 108c of the one or more windows 106 as detected by a sunlight detection sensor. The control device 402 can apply voltage to the electrochromic glass of the third zone (e.g., 108c of FIG. 2) to adjust the light transmission setting of the electrochromic glass of the third zone by turning the electrochromic glass a darker color (more blueish color) that is more opaque. The amount of voltage applied to the electrochromic glass is directly proportional to the light transmission setting of the zone (i.e., the amount of tinting) with a greater quantity of voltage resulting in a light transmission setting comprising a darker color of greater opacity.

In some implementations, the control device 402 can comprise a bus 422 or other communication mechanism for communicating information and a processor 414 coupled with the bus 422 for processing information. The control device 402 comprises a memory device 416 (e.g., main memory), which may comprise random access memory (RAM) 424 or other dynamic storage devices for storing information and instructions (e.g., control module logic 418), such as light transmission logic, to be executed by the processor 414, and read only memory (ROM) 426 or other static storage device for storing static information and instructions for the processor 414. The main memory of the memory device 416 may be a non-volatile memory device and operable to store information and instructions executable by the processor 414.

In some implementations, the control device 402 can be operably coupled with a user interface 412. In some implementations, the user interface 412 can be configured to display information about the status of the light transmission settings for one or more zones of one or more windows. In a non-limiting example, the user interface can be configured to display the real time light transmission settings and associated light transmission properties associated with one or more distinct zones comprising electrochromic glass of the vehicle. In some implementations, the user interface 412 is an interactive display configured to display one or more zones of one or more windows for independent, selective adjustment of respective light transmission properties of one or more particular zones, by the operator. In a non-limiting example, the operator can review the current light transmission settings and associated light transmission properties of one or more distinct zones comprising electrochromic glass and can manually adjust the light transmission settings and associated light transmission properties of one or more distinct zones comprising electrochromic glass.

In some implementations, the control device 402 and, in particular a communication interface 428, can be used to report information about the adaptive window-tinting system 400 to a local network 432 and CAN bus 430. The information can comprise any type of information concerning the adaptive window-tinting system 400 such as, but not limited to, direction of sunlight, intensity of sunlight, current light transmission setting of one or more zones of one or more windows, etc.

FIG. 7 is a flow diagram illustrating an example implementation of a method 600 for controlling the light transmission properties of electrochromic glass of one or more distinct zones of one or more windows of a vehicle, such as a harvester vehicle (e.g., 100 in FIG. 1), based at least upon a direction of sunlight with respect to one or more zones of one or more windows.

At 610, the method comprises providing a feedback signal comprising data indicative of the detected direction of sunlight, such as the direction of the sun's rays, with respect to one or more zones of one or more windows. One or more feedback devices, or sensors, can be configured to detect the direction of sunlight with respect to one or more zones of one or more windows. The one or more feedback devices can comprise light sensors.

At 620, the method further comprises generating a light transmission signal based at least upon the feedback signal and indicative of a light transmission setting of the electrochromic glass of one or more zones of one or more windows.

The control module generates the light transmission signal. The light transmission signal is based at least upon the feedback signal provided by the one or more feedback devices and operably received by the control module.

At 630, the method further comprises adjusting the light transmission setting of the electrochromic glass of one or more zones of one or more windows based upon the light transmission signal. The light transmission setting of the electrochromic glass of one or more zones is independently and selectively adjustable. The light transmission setting of the electrochromic glass can be adjusted by applying a voltage to the electrochromic glass of one or more zones. The amount of voltage applied to the electrochromic glass is directly proportional to the light transmission setting of the zone (i.e., the amount of tinting) with a greater quantity of voltage resulting in a light transmission setting comprising a darker color of greater opacity. In some implementations, the light transmission setting of the electrochromic glass of one or more zones is directly proportional to the directional intensity of the sunlight with respect to the one or more zones.

Figure 8:
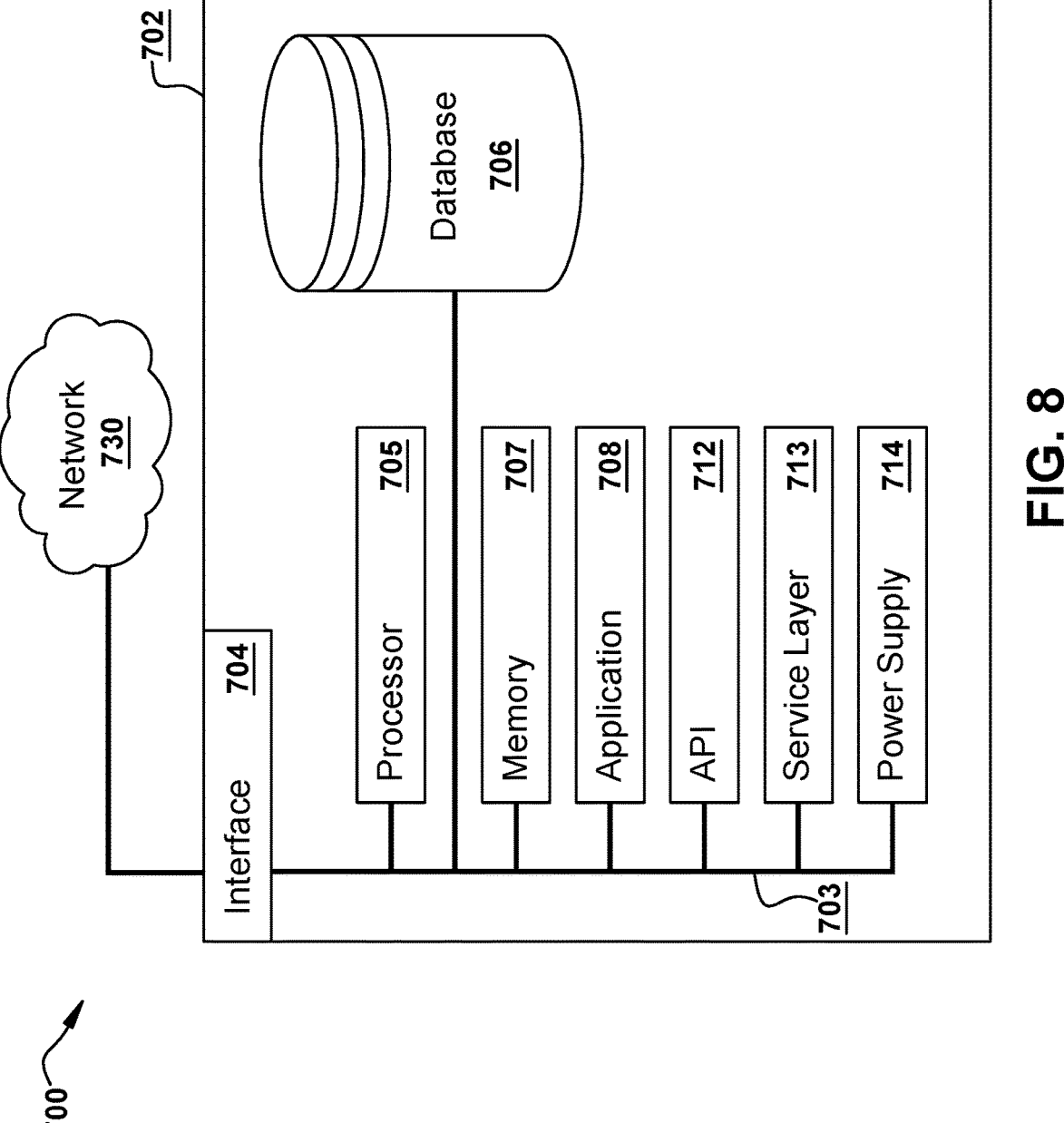
FIG. 8 is a schematic diagram of an example computer system that can be used to provide computational functionalities associated with methods and systems described herein.

FIG. 8 is a schematic diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a high level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both), over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 8, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 8, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 8, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 8, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 508 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

The adaptive window-tinting system disclosed herein is configured to operably control the light transmission properties of one or more distinct zones comprising electrochromic glass by automatically adjusting the light transmission settings of one or more distinct zones comprising electrochromic glass based at least upon the direction of sunlight with respect to one or more zones of one or more windows of a vehicle. In some implementations, the vehicle is a harvester vehicle that travels back and forth across a field during harvesting, continuously changing direction by 180° (e.g., changing the sun's position from the left to right side).

Changing the direction of the harvester vehicle during operation changes the direction of the sun's rays with respect to one or more zones of one or more windows. This ability to continuously detect sunlight and automatically change the light transmission settings of one or more zones (i.e., change the amount of window tinting) is advantageous for the continuous change of direction associated with harvester vehicle operation.

Additionally, the adaptive window-tinting system disclosed herein being configured to independently and selectively adjust the light transmission properties of one or more zones comprising electrochromic glass is beneficial for harvester operation. For example, dividing the front window of the harvester into separate zones that are independently and selectively tinted provides for adjustment of light transmission settings for a top zone of the front window that is receiving more sunlight, while a bottom zone of the front window remains clear and transparent so the operator can see the agricultural implements (e.g., a header) in front of the harvester vehicle.

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A vehicle comprising:
one or more windows including one or more distinct zones comprising electrochromic glass, wherein each zone has independently and selectively adjustable light transmission properties; and
an adaptive window-tinting system that operably controls the light transmission properties of the electrochromic glass of one or more zones based at least upon a direction of sunlight with respect to one or more zones of one or more windows, the adaptive window-tinting system comprising:
one or more feedback devices that operably provide a feedback signal comprising data indicative of the direction of sunlight with respect to one or more zones of the one or more windows;
a control module that operably receives the feedback signal and generates a light transmission signal based at least upon the feedback signal, the light transmission signal indicative of a light transmission setting of the electrochromic glass of one or more zones of one or more windows; and
one or more feedback devices that are at least one of:
configured to detect a voice command from an operator and to generate a signal representative of the detected voice command for adjusting the light transmission setting of the electrochromic glass of one or more zones; or
configured to detect a hand gesture by the operator and to generate a signal representative of the detected hand gesture for adjusting the light transmission setting of the electrochromic glass of one or more zones.

2. The vehicle of claim 1, wherein the adaptive window-tinting system operably controls the light transmission properties of the electrochromic glass of one or more zones based further upon an incident angle of the sunlight with respect to the one or more zones of one or more windows.

3. The vehicle of claim 1, wherein the electrochromic glass comprises an electrochromic glass film.

4. The vehicle of claim 2, wherein the light transmission signal indicative of the light transmission setting of the electrochromic glass of one or more zones of one or more windows is based upon the incident angle of the sunlight with respect to one or more zones of one or more windows and the intensity of sunlight incident one or more zones of one or more windows.

5. The vehicle of claim 1, wherein the feedback devices are light sensors selected from the group comprising photoemissives, photoconductors, photojunction devices, photovoltaics, sun sensors, and combinations thereof.

6. The vehicle of claim 1, further comprising an interactive user interface configured to display the distinct zones for selective adjustment, by the operator, of the respective light transmission settings of one or more zones.

7. The vehicle of claim 1, wherein the vehicle is a harvester vehicle that comprises an operator station configured to house an operator, the operator station at least partially defined by the one or more windows.

8. A method for controlling light transmission properties of electrochromic glass of one or more distinct zones of one or more windows of a vehicle based at least upon a direction of sunlight with respect to one or more zones of one or more windows, the method comprising:
providing, by one or more feedback devices, a feedback signal comprising data indicative of the direction of sunlight with respect to one or more zones of one or more windows; and
generating, by a control module, a light transmission signal based at least upon the feedback signal and indicative of a light transmission setting of electrochromic glass of one or more zones of one or more windows;
adjusting the light transmission setting of the electrochromic glass of one or more zones of one or more windows based upon the light transmission signal; and
detecting, by one or more feedback devices, at least one of:
a voice command from an operator and generating a signal representative of the detected voice command for adjusting the light transmission setting of the electrochromic glass of one or more zones; or
a hand gesture from the operator and generating a signal representative of the detected hand gesture for adjusting the light transmission setting of the electrochromic glass of one or more zones.

9. The method of claim 8, wherein adjusting the light transmission setting of the electrochromic glass of one or more zones of one or more windows based upon the light transmission signal comprises:
applying a voltage to the electrochromic glass of one or more zones, wherein the voltage applied to the electrochromic glass has a magnitude directly proportional to a magnitude of the light transmission setting of the electrochromic glass of one or more zones.

10. The method of claim 8, further comprising:
providing, by one or more feedback devices, a feedback signal comprising data indicative of an intensity of sunlight incident one or more zones of one or more windows.

11. The method of claim 10, further comprising:
adjusting the light transmission setting of the electrochromic glass of one or more zones of one or more windows based upon the light transmission signal, wherein the adjusting comprises:
applying a voltage to the electrochromic glass of one or more zones, wherein the voltage applied to the electrochromic glass has a magnitude directly proportional to the light transmission setting of the electrochromic glass of one or more zones.

12. The method of claim 11, wherein the light transmission signal indicative of a light transmission setting of electrochromic glass of one or more zones of one or more windows is based upon an incident angle of the sunlight with respect to one or more zones of one or more windows and the intensity of sunlight incident one or more zones of one or more windows.

13. An adaptive window-tinting system for controlling light transmission properties of electrochromic glass of one or more zones based at least upon a direction of sunlight with respect to the zones, the adaptive window-tinting system comprising:

one or more windows including one or more distinct zones comprising electrochromic glass, wherein each zone has independently and selectively adjustable light transmission properties;

one or more feedback devices that operably provide a feedback signal comprising data indicative of the direction of sunlight with respect to one or more zones of the one or more windows;

a control module that operably receives the feedback signal and generates a light transmission signal based at least upon the feedback signal, the light transmission signal indicative of a light transmission setting of the electrochromic glass of one or more zones of one or more windows; and one or more feedback devices that are at least one of:

configured to detect a voice command from an operator and to generate a signal representative of the detected voice command for adjusting the light transmission setting of the electrochromic glass of one or more zones; or configured to detect a hand gesture by the operator and to generate a signal representative of the detected hand gesture for adjusting the light transmission setting of the electrochromic glass of one or more zones.

14. The adaptive window-tinting system of claim 13, wherein the adaptive window-tinting system operably controls the light transmission properties of the electrochromic glass of one or more zones based further upon an intensity of sunlight incident one or more zones of one or more windows.

15. The adaptive window-tinting system of claim 14, wherein the light transmission signal indicative of the light transmission setting of the electrochromic glass of one or more zones of one or more windows is based upon an incident angle of the sunlight with respect to one or more zones of one or more windows and the intensity of sunlight incident one or more zones of one or more windows.

* * * * *